Dec. 11, 1951  A. G. THOMAS  2,578,648
ELECTROMAGNETIC DEVICE
Filed June 9, 1945  5 Sheets-Sheet 1

Albert G. Thomas INVENTOR.

Dec. 11, 1951     A. G. THOMAS     2,578,648
ELECTROMAGNETIC DEVICE

Filed June 9, 1945     5 Sheets-Sheet 2

*Albert G. Thomas* INVENTOR.

Dec. 11, 1951  A. G. THOMAS  2,578,648
ELECTROMAGNETIC DEVICE
Filed June 9, 1945  5 Sheets-Sheet 3

Albert G. Thomas INVENTOR.

*Albert G. Thomas* INVENTOR.

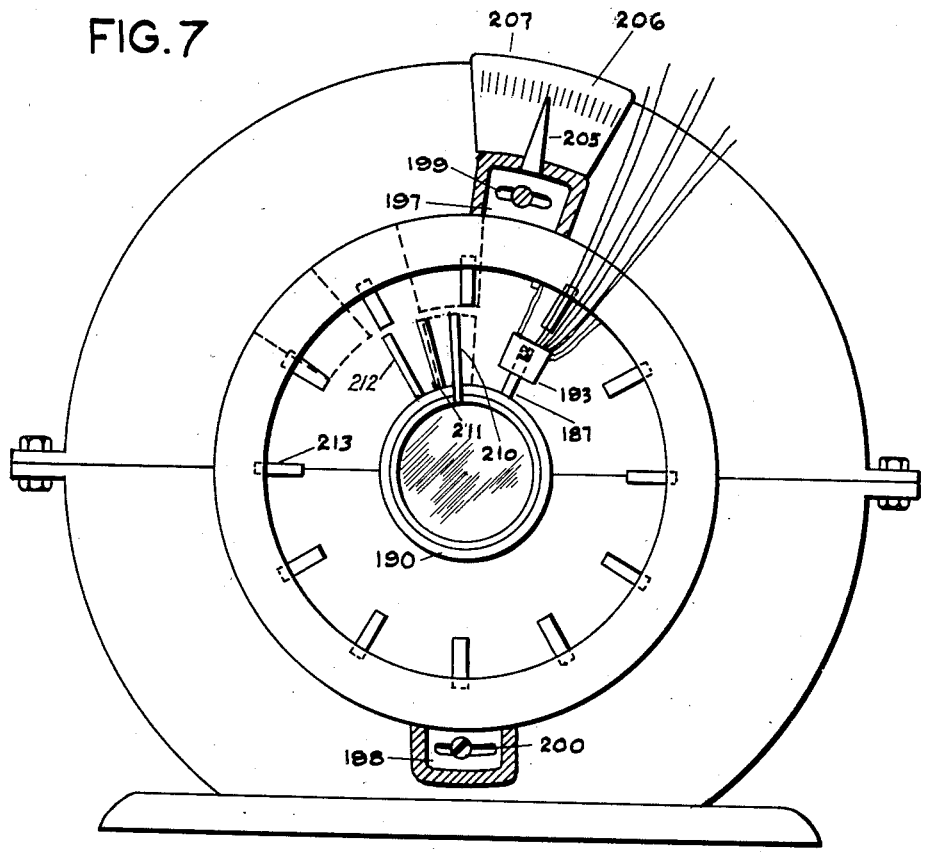

Patented Dec. 11, 1951

2,578,648

UNITED STATES PATENT OFFICE 2,578,648

ELECTROMAGNETIC DEVICE

Albert G. Thomas, Alexandria, Va., assignor, by mesne assignments, to Kearney & Trecker Corporation, West Allis, Wis., a corporation of Wisconsin Application June 9, 1945, Serial No. 598,502

1 Claim. (Cl. 172—36)

This invention relates to electromagnetic devices generally, and especially to motors the rotors of which can be revolved in steps or predetermined angular displacements and which can be stopped at definite positions.

In many applications such as automatic machine tool controls, gun pointers, remote instrument reading duplication, and synchronized movements of various parts or mechanisms as in paper making machinery, textile machinery and the like, there has long been need for a motor which would keep in step with a master motor or other controlling device and which could be stopped or reversed suddenly.

Furthermore, in calculating machines or other computing devices a similar step motor can be used to move through definite displacements or through a definite number of steps or operations, in any desired manner.

It is therefore an object to provide an electromagnetic device for applications as above described.

Another object is to provide a motor which can be quickly energized to move its rotor through a succession of displacements and which can be stopped quickly, without appreciable over-travel.

A further object is the provision of a motor with a plurality of phases each of which operates intermittently.

An additional object is to provide a step motor combined with an intermittent current distributor.

Another object is to provide a polyphase step motor with a current distributor for the phases, the speed of rotation of the motor being determined by the rate of operation of the distributor.

A further object is the provision of an intermittent or step motor that can be readily reversed.

A still further object is to provide an intermittent motor the speed of which can be varied by means of a connected commutator, phase energizing timing devices, or other means.

Another object is to provide electromagnetic or electronic distributing means for a plurality of motor phases, which can be controlled by repeatedly making and breaking one circuit.

An additional object is the provision of a tape or film-controlled motor system for automatic machine tools or the like.

Another object is the provision of means for automatically energizing the various phases or sections of a step motor at predetermined relative positions of rotor and stator teeth.

Other objects will appear in the following description.

In the drawings:

Figure 7 is a left end elevation showing certain parts of the device of Figure 6.

Figure 1:
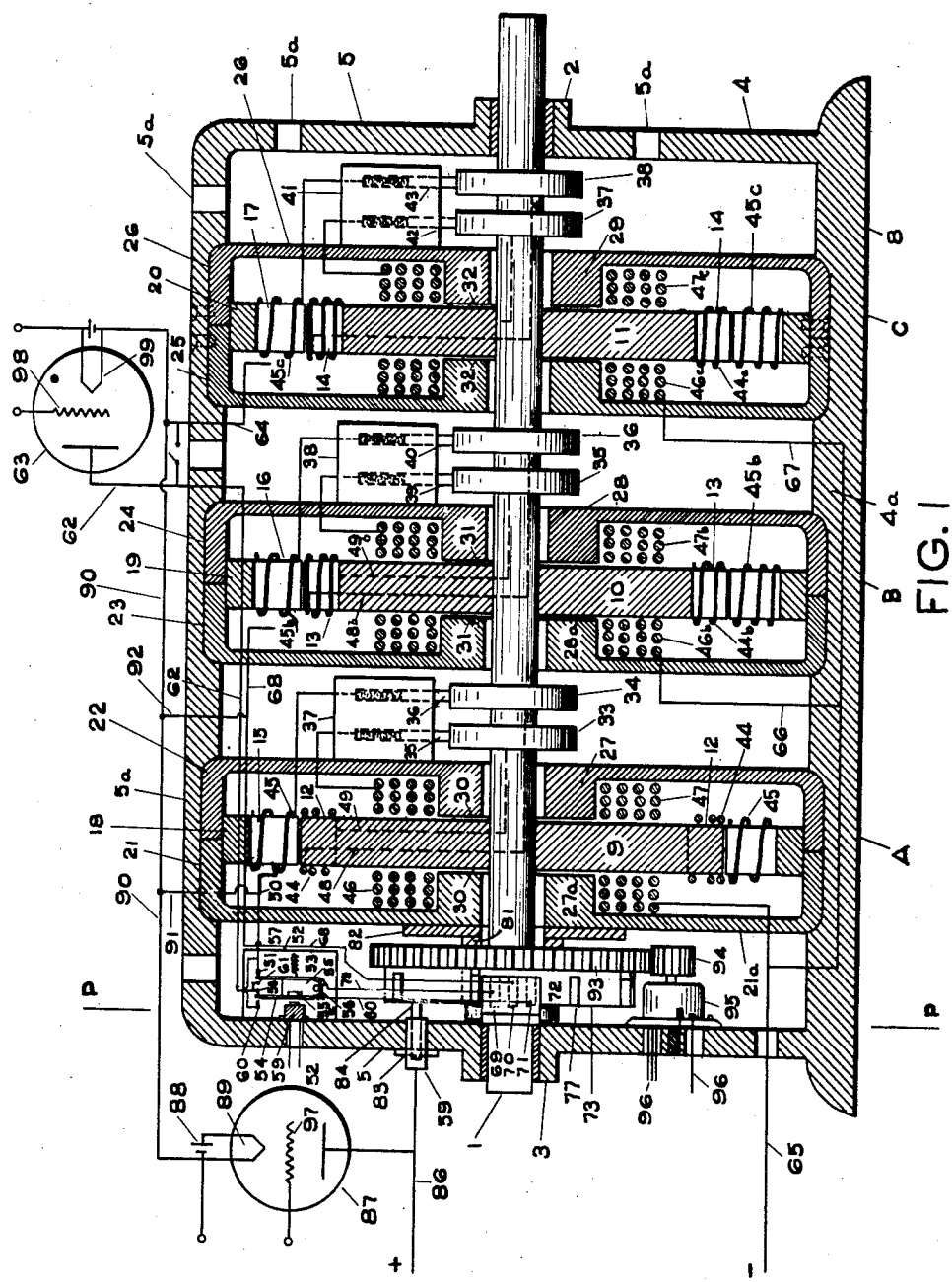
Figure 1 is an elevation, in part section, of a polyphase intermittent or step motor with various controls.
Figure 2:
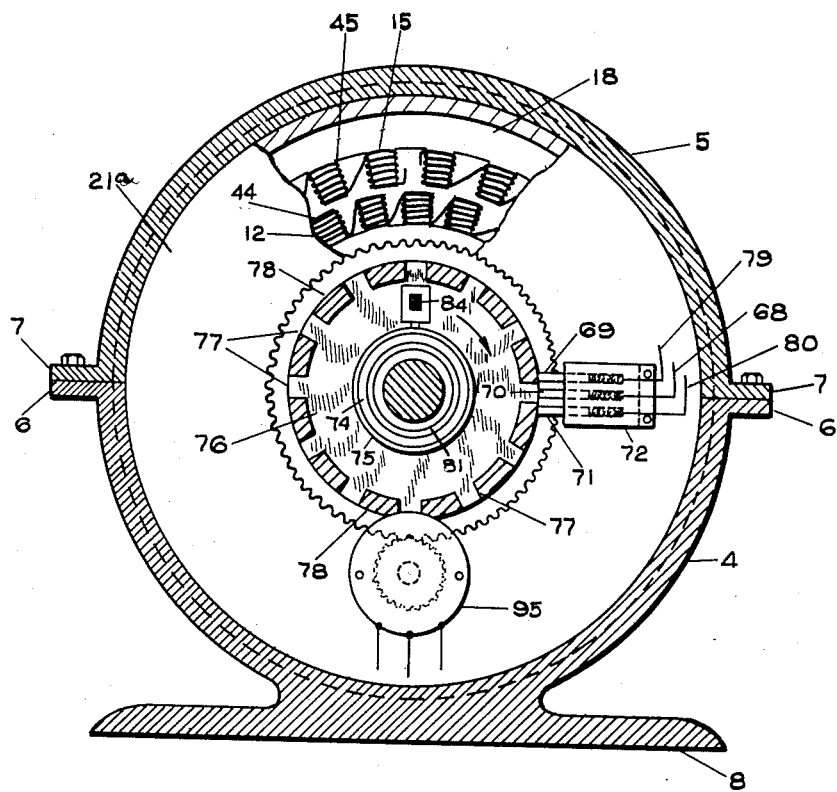
Figure 2 is a left end elevation of the motor shown in Figure 1, the casing being cut away by a plane at right angles to the axis and passing through lines P—P. An inner casing is shown partly broken away.
Figure 6:
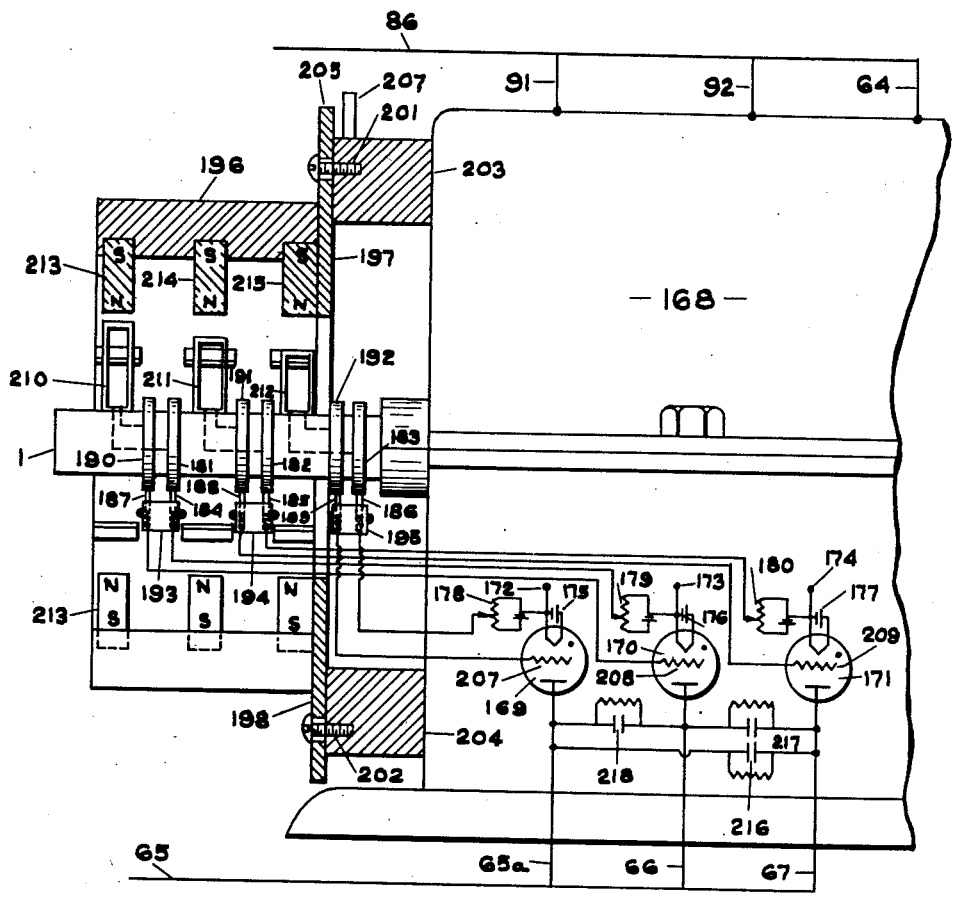
Figure 6 is an elevation, in part section, of a step motor similar to Figure 1 and associated electronic phase energizing control including suitable circuits.

In Figure 1 rotor shaft 1 is rotatable in bearings 2 and 3 formed from projections from lower semi-cylindrical casing 4 and upper semi-cylindrical casing 5 which are bolted together along flanges 6 and 7 as illustrated in Figures 2 and 6. Base 8 is integral with lower casing 4.

Figure 3:
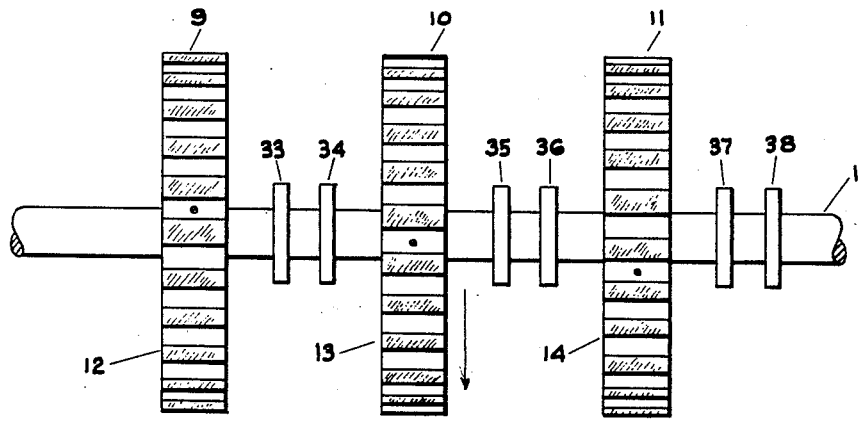
Figure 3 is an elevation of the shaft and attached rotors of the motor shown in Figure 1.
Figure 4:
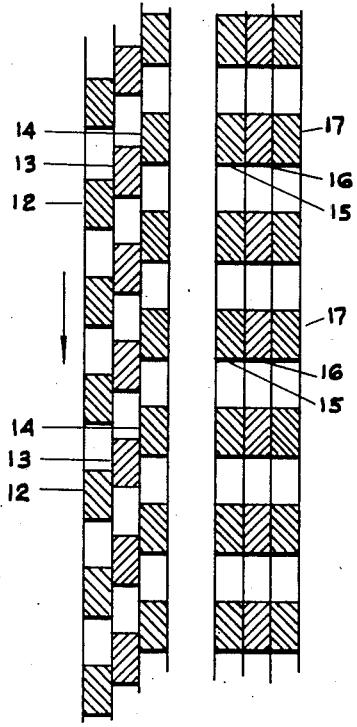
Figure 4 is a diagrammatic representation of some of the field teeth and rotor teeth of the motor; showing the relative phasing of the rotor teeth.

Rotors 9, 10, and 11 preferably of laminated silicon steel or similar metal of good magnetic permeability, are screwed or otherwise fastened to shaft 1 with their planes parallel and preferably, uniformly spaced. These rotors may have hubs if desired. Rotors 9, 10, 11, have, respectively, radially disposed, equally spaced teeth 12, 13, and 14, extending completely around their circumferences. As indicated in Figure 3, the teeth of the three rotors are not axially aligned but are circumferentially staggered, considering an imaginary cylinder surrounding the three rotors. If the teeth seen in Figure 3 travel in the direction of the arrow, for forward movement, then the leading edges of teeth 13 overlap the trailing edges of teeth 12 by ⅓ of a tooth width. Similarly the leading edges of teeth 14 overlap the trailing edges of teeth 13 by ⅓ of a tooth width. This is shown clearly in diagrammatic representation, Figure 4, in which, for purposes of illustration, the teeth 12, 13 and 14 are shown as a partial development and closely adjacent. Stator teeth 15, 16, and 17, extending radially inwardly from stator rings 18, 19, and 20, are also indicated in Figure 4 as being closely adjacent although they are actually separated. It will be observed that the stator teeth, which are uniformly spaced around the inner periphery of the stator, are in alignment in an axial direction. Each rotor has the same number of teeth as its associated stator and the spacings between both rotor and stator teeth are the same as the width of a tooth in a circumferential direction.

It is not essential that the spacing between teeth be the same as the tooth width or thickness, as other arrangements can be used, depending upon the number of phases employed and other factors. It is also not essential that the stator have the same number of teeth as the rotor since a lesser number can be used.

Figure 5:
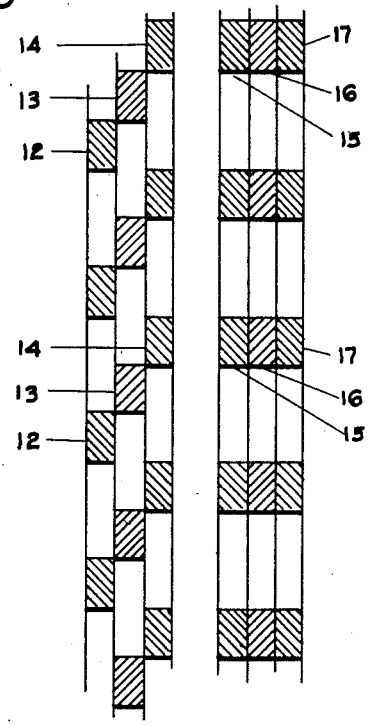
Figure 5 shows an alternative arrangement for that of Figure 4.

An illustration of another workable arrangement is shown in Figure 5 which represents a partial development similar to Figure 4. The stator and rotor teeth are separated by spaces twice the circumferential width of a tooth. One advantage of this spacing is that the rotor teeth just entering alignment with the energized stator teeth are far removed from trailing stator teeth tending to move the rotor in reverse direction. The stators are preferably formed of a plurality of silicon steel or other laminations bolted or otherwise fastened together, as may be the rotors.

Stator rings 18, 19 and 20 are closely fitted in double cups or pans 21—22, 23—24, and 25—26, the annular edges of which abut in planes at right angles to the axis of shaft 1 and passing through central planes of the rotor, as shown, or in other suitable positions. These pans are preferably made of the same material as the stators and rotors and are preferably laminated, the layers extending in such direction or directions that continuous flux paths will be furnished from the stator ring peripheries to the central annular internal hubs 27—27a, 28—28a, 29—29a, of the pans. These hubs are provided with central bores or circular openings of considerably larger diameter than the diameter of shaft 1 but their annular faces 30, 31, 32 are situated as closely as practicable to the respective faces of the rotors in order to provide short air gaps for magnetic flux.

Pans 21—22, 23—24, and 25—26 may be screwed or otherwise fastened to stator rings 18, 19, and 20 respectively and these pans are nested in suitable internal circular grooves or recesses in cylindrical portions 4a and 5a of the casing which may be of metal or non-metal material, as desired. It is obvious that when flanges 6 and 7 are bolted together, the double pans will be held in their proper positions, as indicated, by the grooves. They may be further secured by screws passing through the casing.

Slip rings 33 and 34, are mounted upon shaft 1, suitable insulation being provided. These rings are situated between pans 22 and 23 and are in electrical contact with brushes 35 and 36, which are slidable in slots in insulating block 37 which is screwed to a face of pan 22 in the position shown. The brushes are pressed toward the slip rings by suitable springs in the slots. Electrical leads, connected with the brushes or springs, are brought out of the block which may be of bakelite or other similar material. Similar blocks 38 and 41, carrying similar brushes 39 and 40, and 42, and 43, respectively, are fastened to pans 24 and 26 and cooperate with slip rings 35, 36, and 37, 38 as illustrated.

Rotor teeth 12 are wound with coils 44 of insulated wire. These coils may be in series all around the periphery of the rotor or they may be connected in series-parallel groups or in parallel, in order to reduce inductance and so to reduce the interval of time required to energize or de-energize them. In any case the rotor teeth are wound so that all of them have the same polarity in a radial direction. In other words, all the outer tips of the rotor teeth are of the same polarity. Similarly the stator teeth 15 of section A are wound with coils 45 which may be connected to reduce inductance as described, and these coils are adapted to magnetize the stator teeth so that all their inward tips have the same polarity of opposite sign to that of the rotor teeth tips. Coils 46 and 47 may be wound around hubs 27a and 27 respectively in order to increase the magnetic flux. The motor could be operated from these coils alone, without wound teeth, in some applications.

The terminals of all the connected rotor coils 44 are connected to slip rings 33 and 34 through insulated conductors 48 and 49 passing through suitable channels in rotor 9 and attached hollow shaft 1. One terminal of connected stator coils 45 is connected to brush 36 and the other terminal of these coils, not shown, is connected to conductor 50 leading to contacts 51 and 60 of double pole, double throw relay 52 which is fastened to casing 5. This relay has contact arms 53 and 54 fastened to insulating block 55 which is pivoted to the base of the relay at 56. Spring 57 normally holds arm 54 against contact 58 and arm 53 against contact 61. When relay coil 59 is energized, arm 54 is pulled against contact 60 and arm 53 is pulled against contact 61. Contacts 58 and 61 are electrically connected and contacts 60 and 51 are similarly connected. Contacts 58 and 61 are connected to conductor 62 leading to the anode of gaseous relay tube 63 the cathode of which is connected, by means of conductor 64, to a terminal of field coils 45c which are wound with respect to field teeth 18 of section C in the same manner that coils 45 are wound with respect to field teeth 15. Similarly field coils 45b are wound around field teeth 16 of the middle section B of the motor. Sections A, B, and C are wound in identical manner except that the rotors are displaced in angular relationship.

Coils 46 and 47 are connected in series or parallel and one terminal of the coils is connected to line conductor 65 which is also connected to similar coils 46b—47b and 46c—47c by means of conductors 66 and 67, respectively. The other terminals of coils 46—47, 46b—47b, and 46c—47c, are connected, respectively, with brushes 35, 39, and 42. Brush 40 is connected to one terminal of field coils 45b the other terminal of which is connected to brush 70 by means of conductor 68. Brushes 69, 70, and 71 are slidable in slots in bakelite or other insulating block 72 which is screwed to the left end wall of casing 5. Suitable springs are placed in the slots to urge the brushes against commutator 73 which comprises a metallic bearing sleeve 74, a surrounding insulating sleeve 75 and a metal ring 76 tightly pressed on the sleeve 75. Ring 76 has a plurality of equally spaced integral commutating contact elements 77 the spaces between which are filled with plastic or other insulating material 78. The commutator is turned or molded to have a relatively smooth cylindrical surface.

Brush 69 is connected with relay arm 53 by means of flexible conductor 79 and flexible conductor 80 connects relay arm 54 with brush 71. The brushes are arranged so that the commutating elements 77, rotated in a clockwise direction (Figure 2), will come in contact with brush 69 first, then with brush 70, and lastly with brush 71.

Bearing sleeve 74 is rotatable upon sleeve 81 which is attached to disc 21a of pan 21 by means of flush screws (not shown) passing through integral flange 82. The inner diameter of sleeve 81 is preferably of larger diameter than that of shaft 1 though not necessarily so.

Insulating block 83, holding spring pressed brush 84, is fastened in an opening in end wall 5 and is connected with other line conductor 86 which is also connected with the anode of gaseous relay tube 87. The cathode of this tube is energized by a suitable current source 88 which may be a battery, a transformer or a line connection. The cathode of tube 63 may likewise be energized. These relays may be controlled in known manner by establishing potential differences between the grids and cathodes. Pulsating direct current or alternating current may be applied to lines 86—65, or direct current in some cases. While electronic relays 87 and 63 are shown, other types of relays can be used.

Brush 84 is pressed against the adjacent face of ring 76 so that line 86 is at all times electrically connected with elements 77. Cathode 89 is connected to conductor 50 and to conductors 68 and 64, by means of conductors 90, 91, and 92, as indicated.

Gear 93 is fastened coaxially to sleeve 74 or to ring 76 but is insulated from the latter if of metal. This gear is meshed with pinion 94 on the shaft of small motor 95 which is fastened by screws or otherwise to end wall 5. This motor may be of any suitable type such as synchronous, series, shunt or of other design. In case it is desired to vary the speed of rotation of shaft 1, motor 95 should be of variable speed type. This motor may be energized through conductors 96.

It is obvious that the various rows or sections of rotor teeth could be in alignment and the stator teeth could be staggered. Furthermore the stator could comprise one row of teeth long enough to register with the several rows of rotor teeth, or, the rotor could have one row of long teeth to register with several rows of staggered stator teeth.

In operation, grid 97 of tube 87 is made sufficiently negative with respect to cathode 89, by any suitable means, so that relay tube 87 does not conduct current. Grid 98 of tube 63 is made sufficiently positive with respect to cathode 99 so that tube 63 is adapted to conduct current when sufficient potential is applied between the anode and cathode of the tube.

Relay 52 is normally in the position shown in Figure 1, and if motor 95 is then energized to rotate gear 93 in a clockwise direction as viewed in Figure 2, commutating elements 77 will be rotated beneath brushes 69, 70, and 71 in the order named so that the field coils and rotor coils of section A of the motor will first be energized, then the field and rotor coils of section B will be energized and after that the field and rotor coils of section C will be energized. This order of coil energization is repeated for each element 77 passing under the brushes. When any rotor tooth is partially within the projected cross sectional area of an adjacent stator tooth, the rotor tooth will be brought into alignment with the stator tooth by electromagnetic action, when rotor and stator coils are energized by passing current through them. Each rotor tooth is therefore more or less snapped into alignment with an adjacent partially overlapping stator tooth when the stator and rotor tooth coils of any one section are simultaneously energized. This is due to the tendency of a coil carrying current, in a magnetic field, to embrace the maximum number of lines of magnetic force or flux. There is also a polar magnetic attraction effective to cause alignment of the teeth. I have found that this aligning effect in poles wound as described, is very quick and powerful.

If, as shown in Figure 4, we consider that rotor teeth 14 of rotor 11 are in alignment with the stator teeth 17, due to a commutator element 77 making contact with brush 71 and energizing rotor coils 44c and field coils 45c, and assume that the rotor is to be revolved in the direction of the arrow, then it will be observed that teeth 12 of rotor 9 have begun to enter alignment with stator teeth 15 by ⅓ of a tooth width and that rotor teeth 13 of rotor 10 have emerged from alignment with stator teeth 16 by ⅔ of a tooth width. If now commutator or ring 76 is rotated further to bring the next following element 77 under brush 69, electrical connection of line 86 with the stator and rotor coils of section C will be broken and coils 44 and 45 of section A will be energized so that the rotor teeth will be snapped forward ⅔ of a tooth width until rotor teeth 12 are in alignment with stator teeth 15. When this happens, rotor teeth 13 will be brought ⅓ of a tooth width toward alignment with stator teeth 16 and rotor teeth 14 will be brought out of alignment with stator teeth 16 by ⅔ of a tooth width. As element 76 is revolved, independently of shaft 1, the element 77 under consideration will next come into contact with brush 70 so that stator coils 45b and rotor coils 44b of section B will then be energized and rotor teeth 13 will snap into alignment with stator teeth 16. When this happens, rotor teeth 14 will be brought ⅓ of a tooth width toward alignment with stator teeth 17 and rotor teeth 12 will be brought out of alignment with stator teeth 15 by ⅔ of a tooth width. When the element 77 next touches brush 71, in being revolved, the teeth will be returned to the relative positions shown in Figure 4, since the coils 44c, 45c, and 46c—47c will be energized.

The circumferential widths of elements 77 and brushes 69, 70, and 71, and the spacing between the brushes can be so chosen that an element 77 breaks contact with a preceding brush before engaging the next brush so that the rotor and field coils of any section of the motor are de-energized before energization of the coils of the next section takes place. If, for any reason, it is desired that the coils of a leading section continue to carry current until, or even after the coils of a following section become energized, this can be accomplished by spacing brushes 69, 70, and 71 sufficiently closely so that elements 77 will overlap the spaces separating them.

It is clear, therefore, that rotation of commutator 76—77 will cause the coils of the motor sections to become consecutively energized to cause revolution of the rotor shaft 1 in a succession of steps. The rate of rotation of the commutator will determine the rate of rotation of shaft 1. By properly choosing the number of elements 77 on the commutator, any desired ratio of rotational speed of shaft 1 with respect to the speed of the commutator can be attained. Each time an element 77 passes under brushes 69, 70 and 71, the rotor peripheries are moved through 3 x ⅔ tooth width, i. e. 2 tooth widths.

Commutator 76—77, driving motor 95, and brushes 69, 70, 71, are shown mounted in the motor casing but these elements can be separated from the motor proper by any desired distance. Electrical conductors of any practicable length can connect the brushes and coils. The commutator may be manually turned to indicate positions and the rotor shaft will closely follow the angular displacement of the commutator, either through the same angles or proportional angles, as desired, depending upon the number of commutator elements 77 and the number of teeth. For instance, the commutator, requiring little force to operate it, can be turned by an instrument of any kind and the motor shaft will be turned in proportion to the indication of the instrument. The motor can be used to drive any control element or one or more other instruments. Furthermore, the commutator can be used as a pilot control to cause a plurality of motors to rotate in unison or at definite ratios of speed, depending upon their design. Such synchronized rotating motors will be useful in driving paper making machines, textile machines and others which require accurately coordinated movements of parts.

In machine tool controls, particularly, it is desirable for some applications that motors do not over-travel i. e. that they stop immediately when de-energized. This invention is especially valuable for such purposes since the rotors can be made to stop within a peripheral displacement of one tooth width or slightly more or less.

If the armature is being revolved so that the motor shaft is rotated in short steps as described, this rotation can be suddenly stopped by charging grid 97 suddenly positively with respect to cathode 89 or sufficiently less negatively, so that tube 87 fires and electrically connects positive line 86 with conductor 90 and connected conductors 91, 92, and 64. This causes all of the field and rotor coils and also the coils 46—47, 46b—47b, and 46c—47c to become energized so that at least one section of rotor coils will become magnetically locked with respect to its associated stator coils, since the commutator will then be by-passed.

As illustrated by Figure 4, regardless of which section of stator and rotor teeth becomes magnetically locked due to being brought in alignment, the remaining two sections of rotor teeth will be electromagnetically urged in opposed directions with equal force so that their torques will be cancelled or neutralized. The motor can therefore be quickly brought to a stop when line 86 is connected to conductor 90. If a conventional gaseous relay tube 87 is used the line potential should preferably be pulsating D. C. as furnished by a rectifier or other device or, alternating current can be used, in order for the grid 97 to regain control to stop flow of current through the tube, by charging the grid negatively, when it is desired to start revolution of the rotor shaft 1 again.

If desired, grid 98 of tube 63 can be charged negatively to stop flow of current to the coils of section C at the same time that tube 87 is made to conduct current. In this way two sections of coils will be energized so that the rotors will assume resultant stationary positions. Another tube, similar to tube 63, can be connected in circuit with the coils of section B so that both sections B and C are de-energized when section A is energized through tube 87. Tube 63 could be omitted.

In case coils 46—47, 46b—47b, and 46c—47c, are used, which is not essential, they will be energized and de-energized simultaneously with their respective associated field and rotor coils.

It is possible to maintain the stator coils constantly energized and to vary the energization of the rotor coils, or vice versa, but induced magnetism in the teeth would cause a certain braking action and it is preferable to vary the current through both stator and rotor coils, for ordinary usage.

The rotor shaft 1 can be reversed in direction by reversing the direction of rotation of the commutator but for fast reversal it is preferable to energize relay coil 59 by any suitable means such as a tube, so that iron element 55a is attracted and arms 53 and 54 are brought into connection with contacts 61 and 60 respectively. This connects brush 69 with conductor 62 and connects brush 71 with conductor 50 so that the coils of the sections of the motor will now be charged in such order that shaft 1 will be revolved in reverse direction. For forward rotation again, coil 59 is de-energized and spring 57 pulls the relay arms back into the positions shown. Reference to the diagrammatic development of Figure 4 will show that this reversal occurs when the connections to sections A and C are juxtaposed with respect to the brushes, as described. Relay 52 could of course comprise properly connected electronic tubes, for fast action.

In order to control the operation or speed of the motor the electronic governor or commutator, as illustrated in Figures 6 and 7 may be used. Motor 168 has three sections or set of coils similar to those of the motor of Figure 1. The terminals of these coils are connected to line 86 by means of conductors 91, 92, and 64, as before, and line 65 is connected to the other terminals, in order, by conductors 65a, 66, and 67 which are connected to the anodes of gaseous relay tubes 169, 170, and 171, respectively, the cathodes of which are connected to terminals 172, 173, 174, connected with the respective first, second and third section coil terminals. The cathodes are connected with current sources 175, 176, and 177 as indicated. These may be batteries, transformers, or other suitable sources of current. Variable grid biasing potentiometers 178, 179, and 180, including variable resistors connected across potential sources such as batteries, are connected to the respective cathodes, and to slip rings 183, 181, and 182, respectively, as shown, by means of suitable conductors and brushes 186, 184, and 185. Brushes 187, 188, and 189 make contact, respectively, with slip rings 190, 191, and 192. These slip rings are suitably mounted on shaft 1, insulation being provided, and the pairs of brushes are slidably mounted in bakelite or other insulating blocks 193, 194, and 195, which are fastened to annular metal or plastic ring 196 which is screwed or otherwise fastened to plates 197 and 198 which are provided with arcuate slots 199 and 200 through which screws 201 and 202 are passed and are threaded into holes in bosses or studs 203 and 204 extending from the casing of motor 168. Pointer 205 may be attached to plate 197 and scale 206 may be provided on plate 207 attached to boss 203. Screws 201 and 202 may have smooth shoulders to guide the plates 197 and 198 when being rotated through relatively small angles.

The brushes are urged by suitable springs held in the slots in the blocks toward the slip rings which are connected with the terminals of rectangular coils 210, 211, and 212 as indicated by the dotted conductors which may be passed through a central bore in shaft 1 and through connecting radial passages. Brushes 187, 188, and 189, are connected, respectively, to grid 208 of tube 170, grid 209 of tube 171, and grid 207 of tube 169.

Coils 210, 211, and 212 are mounted in slots or on shaft 1 by means of screws, clamps or insulating cement. These coils are suitably spaced axially and, as shown particularly in Figure 7, are spaced along an imaginary circle including their outer ends by 2/3 of the width of a stator or rotor tooth, measured on approximately the same circumference. These coils may be as wide axially, as desirable but are preferably rather thin in a circumferential direction.

Thin, rectangular, permanent magnets 213, 214, 215, are inserted in ring 196 in three circular rows extending radially inward. Magnets 213 are in axial alignment with coils 210; magnets 214 are in axial alignment with coils 211, and magnets 215 are axially aligned with coils 212. Similar poles of all these magnets are directed toward the axis of shaft 1. These are shown as north poles but could, of course, be south poles, or the polarity of one circular group could be opposite to that of an adjacent group. The magnets may be of Alnico or other suitable material. These may be imbedded in a plastic ring 196 or this ring could be of the same material as the magnets or of soft iron, to provide return flux paths. Suitable iron elements on either the stator or rotor could be used to confine the flux from the magnet ends to narrow paths.

Any plane passing through the axis of shaft 1 and traversing a magnet 213 also strikes one magnet 214 and one magnet 215. In other words, the magnets are circularly aligned. The inner ends of the magnets are spaced two rotor or stator tooth widths apart, around the circumference of an imaginary circle including the inner magnet tips. Coils 210, 211, and 212 are wound from suitably insulated wire and may be on forms, or self-supporting. The outer ends of these coils should, when shaft 1 is rotated, pass close to but not touch the magnet ends.

One terminal of condenser 216 is connected to the anode of tube 169 and the other terminal of the condenser is connected to the anode of tube 171. Similarly, condenser 217 is connected between the anodes of tubes 170 and 171 and condenser 218 is connected between the anodes of tubes 169 and 170. If desired, high resistance leaks may be connected across the condensers as shown.

In operation, potentiometers 178, 179, and 180 are adjusted until the grid bias on each tube is such that the tube will not "fire" or conduct appreciable current from line 65 which may be the positive line of a D. C. supply. Now if, say, the rotor teeth of section 1 of the motor are in the positions as indicated in Figure 2, relative to the stator teeth, then if grid 207 is temporarily made sufficiently positive or sufficiently less negative by any suitable means, with respect to the cathode of tube 169, that tube will suddenly conduct current which will pass from line 65, through tube 169, through the rotor and stator coils of section 1, and out line 86. The rotor teeth of section 1 will then be electromagnetically snapped into alignment with the associated stator teeth and will tend to oscillate through decreasing swings about central aligned positions with respect to the stator teeth. Coil 210 is so connected that the electromotive force generated in it by cutting the magnetic field of an element 213, will tend to charge grid 208 negatively when the coil is being rotated in forward or clockwise direction (Figure 7) and a reverse E. M. F. will tend to charge grid 208 positively with respect to the associated cathode when coil 210 is rotated in reverse or counterclockwise direction. It will be seen, therefore, that at some point during the back-swing of coil 210 it will cut the magnetic lines of force from a thin magnet 213 and so will generate an E. M. F. to charge grid 208 sufficiently positively to cause tube 170 to conduct current suddenly to the second section coils so that the rotor is advanced 2/3 of a tooth width. When, however, tube 170 suddenly conducts, the potential of the anode of tube 169 is suddenly reduced below the critical value, by means of condenser 218, and so negatively charged grid 207 is then effective to stop conduction through tube 169. Similarly, grid 209 of tube 171 is made positive when coil 211 swings back past a magnet 214 after energization of the second section of coils and so tube 171 then conducts current to the third section of coils. By means of condenser 217 the anode potential of tube 170 is dropped below the critical value so that conduction through tube 170 is stopped when tube 171 suddenly conducts current. In like manner, coil 212 swings back past a magnet 215 after energization of the third section of coils and so connected grid 207 is made positive so that tube 169 suddenly conducts current to the first section of coils. When this happens, the anode potential of tube 171 is suddenly reduced below the critical value, through the agency of condenser 216 so that conduction through tube 171 is stopped when tube 169 is made to conduct current. The cycle then repeats itself again and again so that the rotor is revolved in steps.

It will be noticed that only one coil 210, 211, or 212 will cut the magnetic field of a magnet at any one instant. Therefore, when any one tube is made conducting, there is no positive-acting E. M. F. in any other grid circuit to prevent a condenser from stopping conduction of a tube. The magnets, being thin, will provide narrow magnetic fields which can be adjusted angularly with respect to the stator teeth, indicated by dotted lines, so that the point of firing of a following tube can be predetermined for any practicable relative position of rotor and stator teeth. The magnets can be shifted by loosening screws 199 and 200 and rotating pointer 205 with respect to scale 206 until the tubes are made to fire at the beginning of backswing of the rotor, at a central aligned position or at the end of backswing, as desired; or at intermediate positions. By means of this governing arrangement, the motor is prevented from running away since any succeeding section of coils is not energized until the rotor is brought to rest and then starts or travels to some extent in a reverse direction. The switching of current from section to section is automatically done in proper order and the rotor can be stopped at any time within a displacement of approximately one tooth width or less. The speed of the motor in this case can be controlled by the voltage applied, and to some extent, by the positioning of the magnets relative to the stator teeth, or by varying the grid bias of tubes 169, 170, 171 which may determine the point of firing i. e. the relative positions of the rotor and stator teeth. The reversing and stopping means, as shown in Figure 1, can be combined with this device.

This automatic method of energizing the coil sections in proper order at selected relative rotor positions or phase points tends to increase the possible controlled speed of the motor since it is not necessary to wait for oscillations of the rotor to cease before energizing the next succeeding section. In fact, the motor can be operated without oscillations since energization can take place at or near the beginning of reverse movement of the rotor.

The adaptability and possible applications of motors and devices of the type described are numerous and of widely varied character.

What I claim is:

In an electromagnetic device including a stator and a rotor, a plurality of groups of stator poles and associated rotor poles, a plurality of winding means for said groups of poles, means for energizing said winding means for said groups in predetermined order, an element fixed to said rotor and having a plurality of magnetic poles; a plurality of coils, one for each of said groups, movable with said rotor; said coils being adapted to connect said energizing means to the winding means for said groups at predetermined relative positions of said stator and said rotor.

ALBERT G. THOMAS.

REFERENCES CITED

The following references are of record in the file of this patent:

UNITED STATES PATENTS

| Number | Name | Date |
|---|---|---|
| 1,009,013 | Barr et al. | Nov. 14, 1911 |
| 1,440,729 | French | Jan. 2, 1923 |
| 1,452,157 | Henschel | Apr. 17, 1923 |
| 1,558,938 | Slepian | Oct. 27, 1925 |
| 1,813,056 | Kern | July 7, 1931 |
| 1,831,735 | Blum | Nov. 10, 1931 |
| 1,873,965 | Kern | Aug. 20, 1932 |
| 1,995,876 | Willis | Mar. 26, 1935 |
| 2,112,852 | Lindell | Apr. 5, 1938 |
| 2,213,108 | Pollard | Aug. 27, 1940 |
| 2,232,097 | Deal et al. | Feb. 18, 1941 |
| 2,298,621 | Holland-Letz | Oct. 13, 1942 |
| 2,402,928 | Summers | June 25, 1946 |

FOREIGN PATENTS

| Number | Country | Date |
|---|---|---|
| 278,430 | Great Britain | Oct. 6, 1927 |